UNITED STATES PATENT OFFICE.

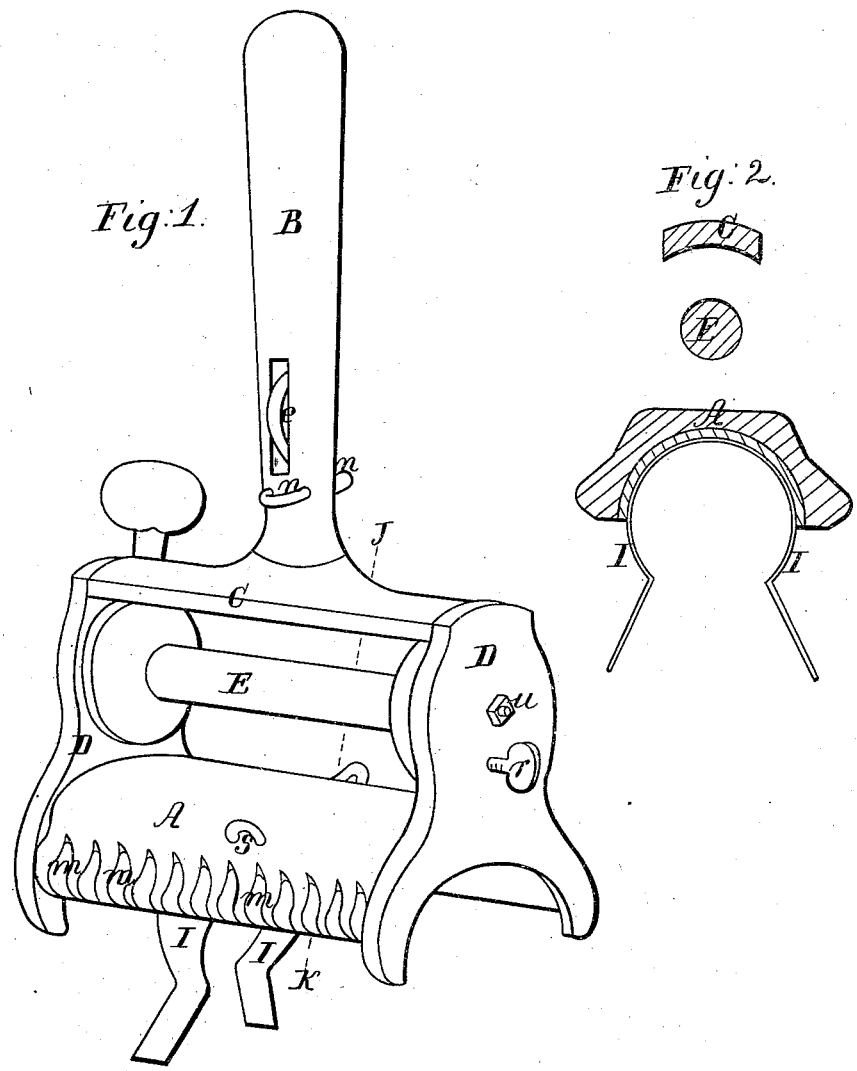

D. H. SOUTHWORTH, OF NEW YORK, N. Y.

SEWING-MALLET.

Specification of Letters Patent No. 9,412, dated November 16, 1852.

*To all whom it may concern:*

Be it known that I, DANIEL H. SOUTH-WORTH, of the city, county, and State of New York, have invented a new and useful Improvement in Sewing-Mallets; and I do hereby declare that the following is a full and exact description thereof, reference being had to the annexed drawings, making part of this specification, in which the figure is a transverse section on the line J K, specially showing the form of the spring clasp.

The nature of this invention consists in combining with an ordinary sewing mallet, a spring clasp, by which the instrument is made to adhere to the rope during the operation of sewing or marling it, and a spool for holding the yarn or marline, by means of which and a set screw or screws, the necessity of employing an assistant to pass the marline (in the form of a ball) around the rope, is obviated.

The body of the mallet A (which I denominate the saddle,) and handle B are similar in form to those in common use, but with the difference that the saddle is made lighter, being more hollow or concave, and that the handle is not attached to the saddle, directly, but to a cross bar C, which is parallel to the saddle, and sufficient distance from it, to admit a spool of the desired size. The two ends of the cross-bar are attached to two head pieces D D, which are also attached to the two ends of the saddle A. The handle is furnished with an anti-friction pulley $e$, and two eyes or staples $n$, $n$, through which the marline is occasionally made to pass, on its way from the spool to the rope. Between the cross-bar and the saddle is mounted a spool E which has its bearings in the two head pieces; or the spool is mounted on an axle-rod which passes through the two head pieces, and of which one terminus is at the screw nut $u$. One of the head pieces is furnished with a set screw $r$, the end of which is made to press against the end of the spool, for the purpose of retarding by friction, or preventing the motion, thereof. This friction screw prevents the marline from passing off too freely from the spool, and the operator is thereby enabled to regulate the tightness of the sewing upon the rope. To the interior or concavity of the saddle is attached a spring clasp I for the purpose of holding the mallet in contact with the rope, whenever so required. On each side of the saddle, is a row of notches $m$ for guiding the marline, and near them a staple $s$ for the same purpose.

What I claim as my invention, and desire to secure by Letters Patent, is—

1. The spring clasp, in combination with the saddle A.

2. The arrangement of the spool E and head posts D D, and set screw $r$, in combination with the saddle.

3. The combination of the anti-friction pulley $e$ with the spool and saddle, the whole being constructed and arranged, substantially in the manner and for the purpose herein described.

DANIEL H. SOUTHWORTH.

Witnesses:
HY. L. HARVEY,
AUG. F. HARVEY.